US010091580B1

(12) United States Patent
Xie et al.

(10) Patent No.: US 10,091,580 B1
(45) Date of Patent: Oct. 2, 2018

(54) METHOD AND APPARATUS FOR TRACKING SOUND SOURCE MOVEMENT FOR AUDIO SIGNAL PROCESSING

(71) Applicant: Marvell International Ltd., Hamilton (BM)

(72) Inventors: Jin Xie, Dublin, CA (US); Sungyub Yoo, Dublin, CA (US); Kapil Jain, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/370,690

(22) Filed: Dec. 6, 2016

(51) Int. Cl.

| | |
|---|---|
| ***H04B 15/00*** | (2006.01) |
| ***H04R 3/00*** | (2006.01) |
| ***G10L 21/0232*** | (2013.01) |
| ***H04R 3/04*** | (2006.01) |
| *G10L 21/0216* | (2013.01) |

(52) U.S. Cl.
CPC .......... *H04R 3/005* (2013.01); *G10L 21/0232* (2013.01); *H04R 3/04* (2013.01); *G10L 2021/02165* (2013.01)

(58) Field of Classification Search
CPC ....... H04R 3/005; H04R 3/04; G10L 21/0232; G10L 2021/02165
USPC .......................................................... 381/94.2
See application file for complete search history.

(56) References Cited

U.S. PATENT DOCUMENTS 4,792,974 A * 12/1988 Chace ...................... H04R 3/12 369/87
2008/0225174 A1 * 9/2008 Greggain ................ H04N 5/46 348/572

* cited by examiner

*Primary Examiner* — Quynh Nguyen

(57) ABSTRACT

Embodiments include a method comprising generating, based on receiving audio signals from a sound source and a noise source, (i) a first input signal and (ii) a second input signal; generating, based on the first input signal and the second input signal, an average signal; operating a first phase loop by phase shifting the first input signal to generate a first intermediate signal such that a sound component in the first intermediate signal is substantially phase aligned with a sound component in the average signal; operating a second phase loop by phase shifting the second input signal to generate a second intermediate signal such that a sound component in the second intermediate signal is substantially phase aligned with the sound component in the average signal; and generating, based on the first intermediate signal and the second intermediate signal, an output audio signal that comprises audio signals from the sound source.

20 Claims, 7 Drawing Sheets

Sound source locator (SSL) mode with high gain

Sound source locator (SSL) mode with low gain

Inverted output of phase error detector while operating in the tracking mode

Tracking mode

Combined operation in the SSL mode and tracking mode

METHOD AND APPARATUS FOR TRACKING SOUND SOURCE MOVEMENT FOR AUDIO SIGNAL PROCESSING

CROSS REFERENCE TO RELATED APPLICATIONS

This disclosure claims priority to U.S. Provisional Patent Application No. 62/265,250, filed on Dec. 9, 2015, which is incorporated herein by reference in its entirety.

TECHNICAL FIELD

Embodiments of the present disclosure relate to audio signal processing, and in particular to tracking movement of a sound source while processing audio signals.

BACKGROUND

When an audio system with microphones captures sound from a sound source, external noise is often also captured by the audio system. Such noise can corrupt the sound from the sound source so much that the sound from the sound source cannot be understood at the receiver. Noise filtering can be performed in an attempt to restore signal quality. Such filtering can be more challenging when, for example, the sound source moves relative to the microphones.

SUMMARY

In various embodiments, the present disclosure provides a method that includes generating, based on receiving audio signals from a sound source and a noise source, (i) a first input signal by a first microphone and (ii) a second input signal by a second microphone and generating, based on the first input signal and the second input signal, an average signal. The method also includes operating a first phase loop by phase shifting the first input signal to generate a first intermediate signal such that a sound component in the first intermediate signal is substantially phase aligned with a sound component in the average signal. Operating the first phase loop also includes operating the first phase loop in a first mode of operation during a first time period and operating the first phase loop in a second mode of operation during a second time period, where the second mode of operation is different from the first mode of operation. The method further includes operating a second phase loop by phase shifting the second input signal to generate a second intermediate signal such that a sound component in the second intermediate signal is substantially phase aligned with the sound component in the average signal and generating, based on the first intermediate signal and the second intermediate signal, an output audio signal that comprises audio signals from the sound source.

In various embodiments, the present disclosure also provides a system that includes a first microphone configured to (i) receive audio signals from a sound source and a noise source and (ii) generate a first input signal. The system also includes a second microphone configured to (i) receive the audio signals from the sound source and the noise source and (ii) generate a second input signal. The system further includes an averaging circuit configured to generate, based on the first input signal and the second input signal, an average signal and a first phase loop configured to phase shift the first input signal to generate a first intermediate signal such that a sound component in the first intermediate signal is substantially phase aligned with a sound component in the average signal. The first phase loop is further configured to (i) during a first time period, operate in a first mode of operation and (ii) during a second time period, operate in a second mode of operation, wherein the second mode of operation is different from the first mode of operation. The system also includes a second phase loop configured to phase shift the second input signal to generate a second intermediate signal such that a sound component in the second intermediate signal is substantially phase aligned with the sound component in the average signal. The system further includes an output circuit configured to generate, based on the first intermediate signal and the second intermediate signal, an output audio signal that comprises audio signals from the sound source.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
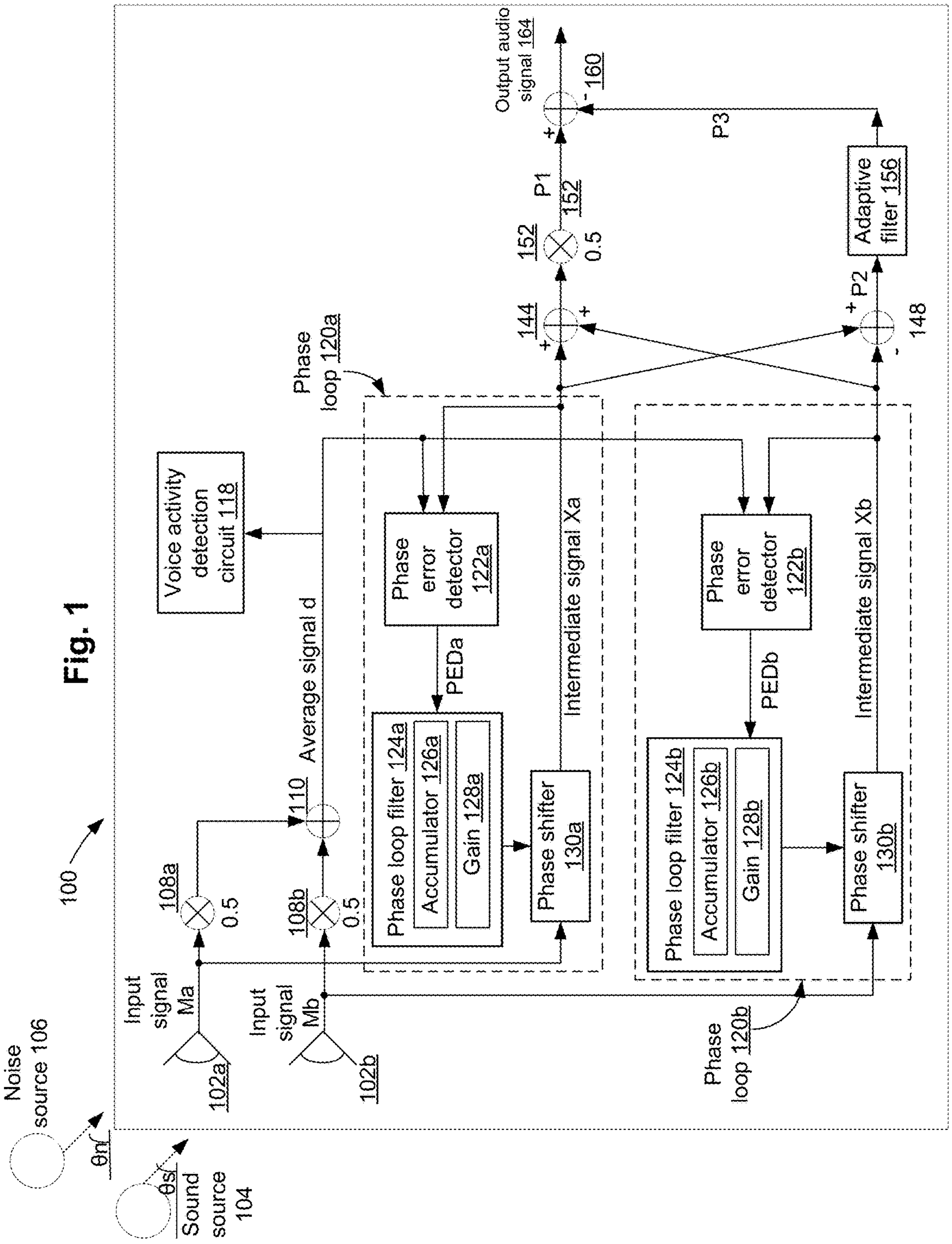
FIG. 1 schematically illustrates a system for audio processing sound from a sound source.

FIG. 1 schematically illustrates a system 100 for audio processing sound from a sound source 104. The sound source 104 can be any sound source, e.g., a person who is speaking. Also present near the sound source 104 is a noise source 106. The noise source 106 can be any source of noise that generates undesirable sound, e.g., a fan making a constant noise, noise from outside a room in which the sound source 104 is located, etc.

In an example, the sound source 104 moves relative to the system 100. This occurs, for example, when a person who is speaking moves around within the room, which represents a gradual movement of the sound source 104. In another example, assume that a first person is currently talking, the first person is the sound source 104. If the first person stops talking and a second person starts talking, then the second person becomes the sound source 104—this represents an abrupt movement of the sound source 104.

The system 100 comprises a plurality of microphones, e.g., microphones 102*a* and 102*b*, although the system 100 may comprise a greater number of microphones as well. The microphones 102*a* and 102*b* are configured to receive audio signals from the sound source 104 and the noise source 106.

In an example, the sound source 104 is positioned at an angle θs from the microphones 102*a* and 102*b*, where, for example, the angle θs is non-zero (i.e., the sound source 104 is at a direction that is not orthogonal to the positioning of the microphones 102*a* and 102*b*). In an example, because the sound source 104 is at a direction that is not necessarily orthogonal to the positioning of the microphones 102*a* and 102*b*, the microphones 102*a* and 102*b* receive sound from the sound source 104 at different times. For example, audio signals from the sound source 104 reaches the microphone 102*a* in a first time period, and audio signals from the sound source 104 reaches the microphone 102*b* in a second time period, where the first time period can be different from the second time period.

In an example, the noise source 106 is positioned at a non-zero angle θn from the microphones 102*a* and 102*b*. Because the noise source 106 is at a direction that is not orthogonal to the positioning of the microphones 102*a* and 102*b*, the microphones 102*a* and 102*b* also receive noise from the noise source 106 at different times.

The system 100 is configured to utilize the time differentiation of the receipt of the sound signal from the sound source 104 and the noise signal from the noise source 106 to eliminate noise from an output audio signal 190. The use of the system 100 in this manner (e.g., utilizing the time differentiation of the receipt of the sound signal from the sound source 104 and the noise signal from the noise source 106) is also known as beamforming. Beamforming is a technique used to achieve spatial selectivity when receiving a signal by more than one microphone.

Unless otherwise mentioned, a sound component in a signal refers to an audio component of the signal that is generated from the sound source 104, and a noise component in the signal refers to an audio component of the signal that is generated from the noise source 106. Thus, for example, if the sound source 104 is a person delivering a speech, then the sound component in a signal refers to the speech from the sound source 104, and the noise component in the signal refers to any noise that may potentially corrupt the speech.

In an example, based on receiving audio signals from the sound source 104 and the noise source 106, the microphone 102*a* generates an input signal Ma. The input signal Ma comprises a sound component from the sound source 104 and a noise component from the noise source 106.

Similarly, based on receiving audio signals from the sound source 104 and the noise source 106, the microphone 102*b* generates an input signal Mb. The input signal Mb comprises a sound component from the sound source 104 and a noise component from the noise source 106.

As discussed herein, the microphones 102*a* and 102*b* receive sound from the sound source 104 at different times. For example, audio signals from the sound source 104 reach the microphone 102*a* in a first time period, and audio signals from the sound source 104 reach the microphone 102*b* in a second time period, where a difference between the first time period and the second time period is based on sin(θs). Similarly, noise from the noise source 106 reaches the microphone 102*a* in a third time period, and noise from the noise source 104 reaches the microphone 102*b* in a fourth time period, where a difference between the third time period and the fourth time period is based on sin(θn).

Assume that the sound component in the input signal Ma is s, and the noise component in the input signal Ma is n. Then, the sound component in the input signal Mb is represented by "s delayed by sin(θs)", and the noise component in the input signal Mb is represented by "n delayed by sin(θn)". Thus, $$Ma=s+n, \quad \text{Equation 1}$$

and $$Mb=(s \text{ delayed by } \sin(\theta s))+(n \text{ delayed by } \sin(\theta n)). \quad \text{Equation 2}$$

In an example, it is assumed that the noise from the noise source 106 is generally lower in intensity than the sound from the sound source 104, and the noise from the noise source 106 has a few loud peaks that are louder than the sound from the sound source 104.

The system 100 comprises a multiplier circuit 108*a* that multiplies the input signal Ma by a value X in a range of 0.25-0.75, e.g., 0.5, and a multiplier circuit 108*b* that multiplies the input signal Mb by a value Y in a range of 0.25-0.75, e.g., 0.5. An addition circuit 110 generates an average signal d, which is a sum of the outputs of the multipliers 108*a* and 108*b*. That is, the average signal d is an average of the input signals Ma and Mb. That is, $$\text{Average signal } d=X*Ma+Y*Mb. \quad \text{Equation 3.}$$

In an example, the multiplier circuits 108*a*, 108*b*, and the addition circuit 110 form an averaging circuit (not labeled in FIG. 1). The averaging circuit generates the average signal d from the input signals Ma and Mb.

The system 100 comprises a phase loop 120*a* and a phase loop 120*b*, illustrated using dotted lines in FIG. 1. The phase loop 120*a* generates an intermediate signal Xa (henceforth referred to as "signal Xa") and phase loop 120*b* generates an intermediate signal Xb (henceforth referred to as "signal Xb"), as illustrated in FIG. 1.

In an example, the phase loop 120*a* comprises a phase error detector 122*a*, which receives the average signal d and the signal Xa. The phase error detector 122*a* detects a difference in the respective phases of the sound components in the average signal d and the signal Xa. For example, the phase error detector 122*a* detects a sign of the difference in the respective phases of the sound components of the average signal d and the signal Xa (e.g., whether the sound component in the average signal d is leading or lagging the sound component in the signal Xa). The phase error detector 122*a* also detects an amplitude of the difference in the respective phases of the sound components of the average signal d and the signal Xa. The output of the phase error detector 122*a* is based on the sign and the amplitude of the difference in the respective phases of the sound components of the average signal d and the signal Xa. As the sound components in the average signal d and the signal Xa are assumed to be higher than the noise components in the average signal d and the signal Xa, the phase error detector 122*a* can detect the phase difference between the sound component in the average signal d and the sound component in the signal Xa.

As will be further discussed in detail herein, the phase error detector 122*a* operates, at any given time, in one of two different modes of operation—a source sound location (SSL) mode and a tracking mode. The mode of operation dictates the manner in which the output of the phase error detector 122*a* is to be based on the sign and the amplitude of the difference in the respective phases of the sound components of the average signal d and the signal Xa.

The output of the phase error detector 122*a* is received by a phase loop filter 124*a*. In an example, the phase loop filter 124*a* comprises an accumulator 126*a* and a gain circuit 128*a*. The accumulator 126*a* accumulates the output of the phase error detector 122*a*. For example, the output of the accumulator 126*a* provides an indication as to whether the sound component of the average signal d is leading or lagging the sound component of the signal Xa over time. When the sound component of the average signal d is substantially aligned with the sound component of the signal Xa, the output of the phase error detector 122*a* is centered around zero, and the output of the phase accumulator settles around $\sin(\theta s)/2$.

The output of the accumulator 126*a* is multiplied by a gain in the gain circuit 128*a* included in the phase loop filter 124*a*. The gain by which the output of the accumulator 126*a* is multiplied is, in an example, based on whether the phase error detector 122*a* operates in the SSL mode or the tracking mode, as will be discussed in further detail herein. In another example and although not illustrated in FIG. 1, the gain circuit 128*a* can be included in the phase error detector 122*a*, instead of being included in the phase loop filter 124*a*. In such an example, the output of the phase error detector 122*a* is multiplied by the gain in the gain circuit 128*a* prior to being transmitted to the accumulator 126*a*.

The phase loop 120*a* further comprises a phase shifter 130*a*. In an example, the phase shifter 130*a* receives the input signal Ma, and selectively phase shifts the input signal Ma to generate the signal Xa. The amount by which the phase shifter 130*a* phase shifts the input signal Ma to generate the signal Xa is based on the output of the phase loop filter 124*a*. That is, the output of the phase loop filter 124*a* controls the phase by which the input signal Ma is phase shifted by the phase shifter 130*a*, while generating the signal Xa.

The phase loop 120*a* provides feedback, via the phase error detector 122*a* and the phase loop filter 124*a*, to the phase shifter 130*a* on the phase difference between the sound components in the average signal d and the signal Xa, based on which the phase shifter 130*a* adjusts the phase of the input signal Ma to generate the signal Xa. Thus, the phase loop 120*a* is configured to align the phase of the sound component of the average signal d with the phase of the sound component of the signal Xa. It is to be noted that while the phase of the sound component of the average signal d is aligned with the phase of the sound component of the signal Xa, the noise components in these two signals are not aligned. This is possible because it was assumed that the sound component is on average louder than the noise component.

In an example, the structure and operation of the phase loop 120*b* is similar to the structure and operation of the phase loop 120*a*. For example, the phase loop 120*b* comprises a phase error detector 122*b*, which detects a difference in the respective phases of the sound components in the average signal d and the signal Xb. As will be further discussed in detail herein, at any given time, the phase error detector 122*b* also operates in one of two different modes of operation—the SSL mode and the tracking mode. The mode of operation dictates the manner in which the output of the phase error detector 122*b* is to be based on the sign and the amplitude of the difference in the respective phases of the sound components of the average signal d and the signal Xa.

The output of the phase error detector 122*b* is received by a phase loop filter 124*b* comprising an accumulator 126*b* and a gain circuit 128*b*. The accumulator 126*b* accumulates the output of the phase error detector 122*b*. For example, the output of the accumulator 126*b* provides an indication as to whether the sound component in the average signal d is leading or lagging the sound component in the signal Xb over time. The output of the accumulator 126*b* is multiplied by a gain in the gain circuit 128*b*. The gain by which the output of the accumulator 126*b* is multiplied is, in an example, based on whether the phase error detector 122*b* operates in the SSL mode or the tracking mode, as will be discussed in further detail herein.

The phase loop 120*b* further comprises a phase shifter 130*b*. In an example, the phase shifter 130*b* receives the input signal Mb, and selectively phase shifts the input signal Mb to generate the signal Xb. The amount by which the phase shifter 130*b* phase shifts the input signal Mb to generate the signal Xb is based on the output of the phase loop filter 124*b*. That is, the output of the phase loop filter 124*b* controls the phase by which the input signal Mb is phase shifted by the phase shifter 130*b*, while generating the signal Xb. The phase loop 120*b* is configured to align the phase of the sound component of the average signal d with the phase of the sound component of the signal Xb. It is to be noted that while the phase of the sound component of the average signal d is aligned with the phase of the sound component of the signal Xb, the noise components in these two signals are not aligned.

In general, it is desirable that the phase loops 120*a* and 120*b* track the direction of the sound source 104 and not track the direction of the noise source 106. Additionally, at power up or initialization, it is desirable that the phase loops 120*a* and 120*b* relatively quickly acquire the phase of the sound source 104. It is also desirable that the phase loops 120*a* and 120*b* relatively quickly re-acquire the phase of the sound source 104 in case of a sudden movement of the sound source 104.

The system 100 further comprises an addition circuit 144 that generates a summation of the signals Xa and Xb. A multiplication circuit 152 multiplies the output of the addition circuit 144 by 0.5, and outputs a signal P1. That is, $$P1=(Xa+Xb)*0.5. \quad \text{Equation 4}$$

The system 100 further comprises a subtraction circuit 148 that generates a signal P2, which is a difference between the signals Xa and Xb. That is, $$P2=(Xa-Xb). \quad \text{Equation 5}$$

As discussed herein above, due to the operation of the phase loops 120*a* and 120*b*, the phases of the sound components of the signals Xa and Xb are both aligned to the sound component of the average signal d. Hence, the sound components of the signals Xa and Xb are also aligned to each other. The phase difference in the sound components in the input signals Ma and Mb is based on $\sin(\theta s)$, as discussed with respect to equations 1 and 2. To align the sound components in the signals Xa and Xb, a relative phase shift (e.g., as shifted by the phase shifters 130*a* and 130*b* while generating the signals Xa and Xb) in the input signals Ma and Mb has to be equal to $\sin(\theta s)$. Due to this phase shift by the phase shifters 130*a* and 130*b*, the noise components in the signals Xa and Xb is further shifted by $\sin(\theta s)$ (e.g., in addition to the original phase difference of $\sin(\theta n)$ in the noise components). Put differently, the noise components in the signals Xa and Xb have a phase difference of $\sin(\theta s+\theta n)$.

Because the sound components of the signals Xa and Xb are aligned with each other and the noise components in the signals Xa and Xb have a phase difference of $\sin(\theta s+\theta n)$, the average of signals Xa and Xb (i.e., the signal P1) is represented by:

$$P1=(Xa+Xb)*0.5=s+(n \text{ delayed by } \sin(\theta s+\theta n)). \quad \text{Equation 6}$$

Similarly, a difference between the signals Xa and Xb (i.e., the signal P2) is given by:

$$P2=(Xa-Xb)=n-(n \text{ delayed by } \sin(\theta s+\theta n)). \quad \text{Equation 7}$$

Thus, the signal P2 represents distorted noise, i.e., a difference between (i) the noise and (ii) the noise delayed by sin(θs+θn). An adaptive filter 156 receives the signal P2 and reconstructs the noise delayed by sin(θs+θn) from the signal P2. A signal P3 output by the adaptive filter 156 represents the noise delayed by sin(θs+θn).

The system 100 further comprises a subtraction circuit 160 to generate an output audio signal 164, which is a difference between the signals P1 and P3. That is, $$\text{Output audio signal}=(P1-P3)=s+(n \text{ delayed by } \sin(\theta s+\theta n))-(n \text{ delayed by } \sin(\theta s+\theta n))=s. \quad \text{Equation 8}$$

That is, the system 100 is configured to filter out the noise from the noise source 106 and to generate the output audio signal 164 that is free of noise, as seen in equation 8.

In an example, the combination of the addition circuit 144, the subtraction circuit 148, the multiplication circuit 152, the adaptive filter 156, and the subtraction circuit 160 is referred to as an output circuit (not separately labelled in FIG. 1), because the output circuit receives the signals Xa and Xb and outputs the output audio signal 164.

The system 100 further comprises a voice activity detection circuit 118. In an example, the voice activity detection circuit 118 receives the average signal d and detects if any sound component is present in the average signal d. Although in another example (and not illustrated in FIG. 1), the voice activity detection circuit 118 can receive at least one of the input signals Ma and Mb and can detect if any sound component is present in at least one of the input signals Ma and Mb. If no sound component is detected, the phase loops 120*a* and 120*b* are frozen. For example, if no sound component is detected, the phase error detectors 122*a* and 122*b* stop determining any phase differences and the phase shifters 130*a* and 130*b* continues shifting phases of the input signals Ma and Mb in a fixed or non-dynamic manner. On the other hand, if a sound component is detected by the voice activity detection circuit 118, the phase loops 120*a* and 120*b* operate in the manner discussed herein above, e.g., operate, at any given time, in one of the SSL mode or the tracking mode.

Modes of Operation

As discussed herein above, each of the phase loops 120*a* and 120*b* operates, at any given time, in one of a SSL mode and a tracking mode. Generally, the SSL mode is configured to relatively effectively track a sudden movement of the sound source 104, while the tracking mode is configured to relatively effectively track a gradual movement of the sound source 104. The operation of the phase error detectors 122*a*, 122*b* and the gain circuits 128*a*, 128*b* are based on the mode in which the corresponding phase loop operates. In an example, the system 100 alternates between these two modes, as will be discussed in more detail herein.

SSL Mode of Operation

In the SSL mode, the system 100 attempts to acquire the unknown speech direction θs. For example, at power up, the system 100 is initialized and the phase loops 120*a* and 122*b* are unaware about the direction of the sound source 104 (i.e., unaware of the value of θs). That is, there is a relatively large phase difference between the sound components of the average signal d and the signal Xa and also a relatively large phase difference between the sound components of the average signal d and the signal Xb. Similarly, when there is a sudden movement of the sound source 104 (e.g., due to a change in a person who is speaking), the phase loops 120*a* and 122*b* are unaware regarding the direction of the sound source 104. In the SSL mode, the phase loops 120*a* and 120*b* attempts to rapidly bring down the phase difference between the sound components of the average signal d and the signal Xa (and also the phase difference between the sound components of the average signal d and the signal Xb). That is, the SSL mode is for rapid adaptation in the phase loops 120*a* and 120*b* during initialization of the system 100 and also to counter any sudden and large movement of the speech source 104.

The output of the phase error detector 122*a* is given by PEDa and the output of the phase error detector 122*b* is given by PEDb. In the SSL mode, the operation of the phase error detectors 122*a* and 122*b* are as follows:

If the Voice activity detection circuit 118 indicates presence of sound from the source 104, then $$PEDa(k)=(Xa(k)-d(k))*(d(k-1)-d(k+1)), \quad \text{Equation 9a}$$

and $$PEDb(k)=(Xb(k)-d(k))*(d(k-1)-d(k+1)). \quad \text{Equation 9b}$$

If the Voice activity detection circuit 118 indicates an absence of sound from the source 104, $$\text{then } PEDa(k)=0, \quad \text{Equation 10a}$$

and $$PEDa(k)=0. \quad \text{Equation 10b}$$

In equations 9a, 9b, 10a, and 10b, k is the time index. Furthermore, in the SSL mode, the gain circuits 128*a* and 128*b* have relatively higher gains (e.g., compared to the gains in the tracking mode). Also, as seen in equations 9a and 9b, the output of, for example, the phase error detector 122*a* is not merely based on a difference in the phase of the signal Xa and the average signal d, but is also based on how the average signal d changes with time.

Figure 2:
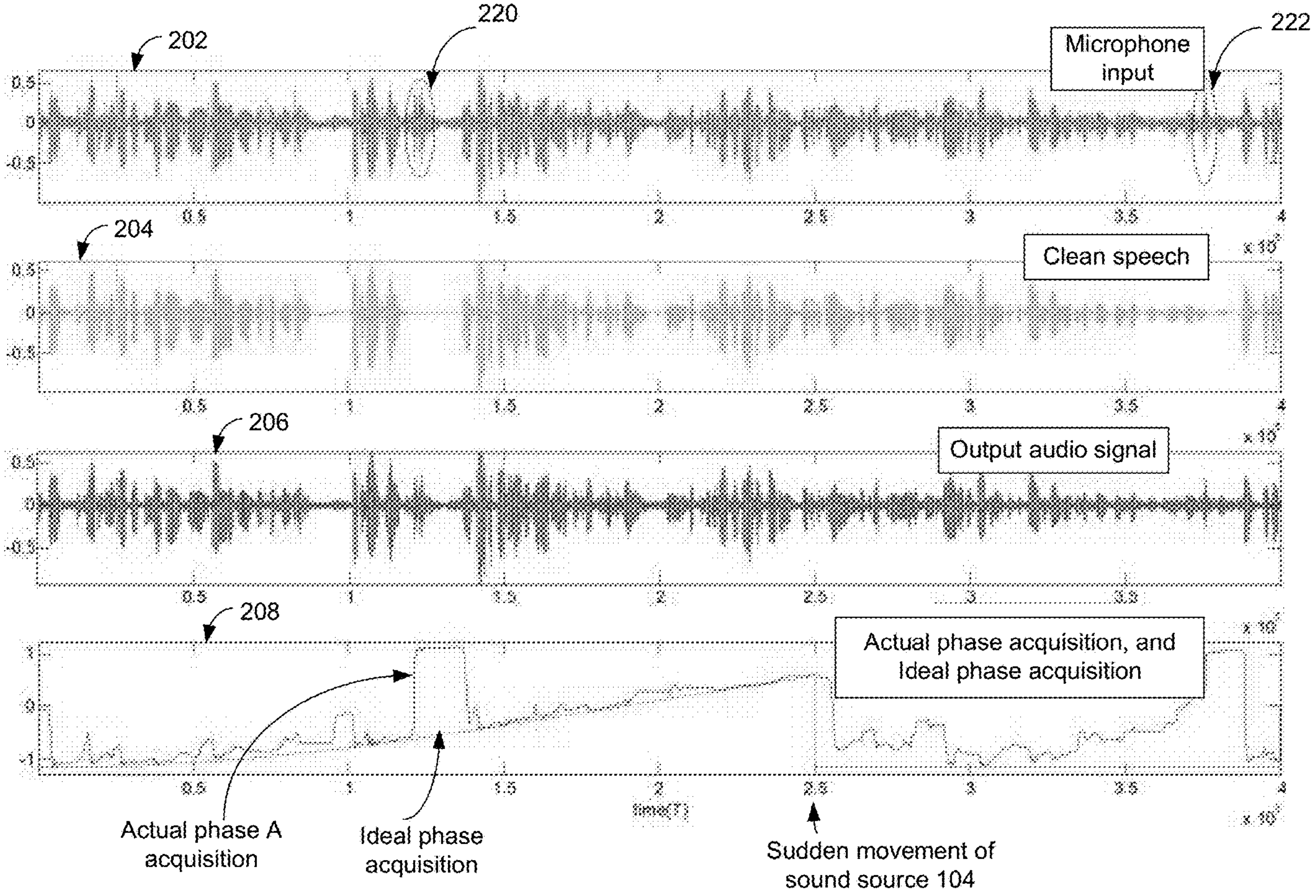
FIG. 2 illustrates graphs depicting an operation of the system of FIG. 1, when the system operates in a first mode.

FIG. 2 illustrates graphs 202, 204, 206 and 208 depicting an operation of the system 100 when the phase loops 120*a* and 120*b* operate solely in the SSL mode, and when the gain circuits 128*a* and 128*b* have relatively higher gains (e.g., compared to the gains in the tracking mode). An X axis in each of the graphs 202, . . . , 208 represents time in time interval T. In the simulation that generated the graphs 202, . . . , 208, the distance between the microphones 102*a* and 102*b* is 5 cm, and a sampling frequency of the system is 16 kHz. The sound source 104 is initially at 90 degrees (i.e., initially, θs=90 degrees), and gradually moves from 90 degrees to −30 degrees from time OT to time $2.5\times10^5$T (i.e., immediate prior to $2.5\times10^5$T, θs=−30 degrees). At time $2.5\times10^5$T, the sound source 104 suddenly jumps to 90 degrees, e.g., due to a change in the person speaking (i.e., immediate after $2.5\times10^5$T, θs=90 degrees). The noise source 106 is always at −90 degrees. Also, the noise component from the noise source 106 is on average smaller than the sound from the sound source 104. However, the noise component has a few high peaks, e.g., at $1.2\times10^5$T and at $3.75\times10^5$T. The high peaks in the noise are illustrated using oval shapes 220 and 222 in the graph 202.

The top graph 202 illustrates the input to the microphones 102*a* and 102*b* versus time. As discussed above, in the graph 202, the points 220 and 222 represent high peaks in the noise. The graph 204 illustrates hypothetical clean speech, i.e., sound from the sound source 104 without any noise from the noise source 106. The graph 206 illustrates the output audio signal 164. The graph 206 illustrates an actual phase acquisition of the phase loops 120*a* and 120*b*, and also illustrates an ideal phase acquisition of the phase loops 120*a* and 120*b*.

As discussed herein above, the phase loop 120_a_ is configured to align the phase of the sound component of the average signal d with the phase of the sound component of the signal Xa. Similarly, the phase loop 120_b_ is configured to align the phase of the sound component of the average signal d with the phase of the sound component of the signal Xb. This is possible because, for example, generally, the sound component is higher than the noise component in the signals Xa, Xb and d. However, as illustrated in FIG. 2, the noise can have some momentarily loud peaks (e.g., at 220 and 222). Such high peaks results in the phase loops 120_a_ and 120_b_ trying to track the noise, due to which the phase loops 120_a_ and 120_b_ are disturbed.

Thus, while the system 100 operates in the SSL mode, the actual phase acquisition tracks the ideal phase acquisition with reasonable accuracy during initialization and also when there is a sudden movement of the sound source 104. However, due to the above discussed phenomenon, the actual phase acquisition cannot track the ideal phase acquisition in the event of momentarily loud peaks (e.g., at 220 and 222). Thus, the loud peaks shows up in the output audio signal 164.

Figure 3:
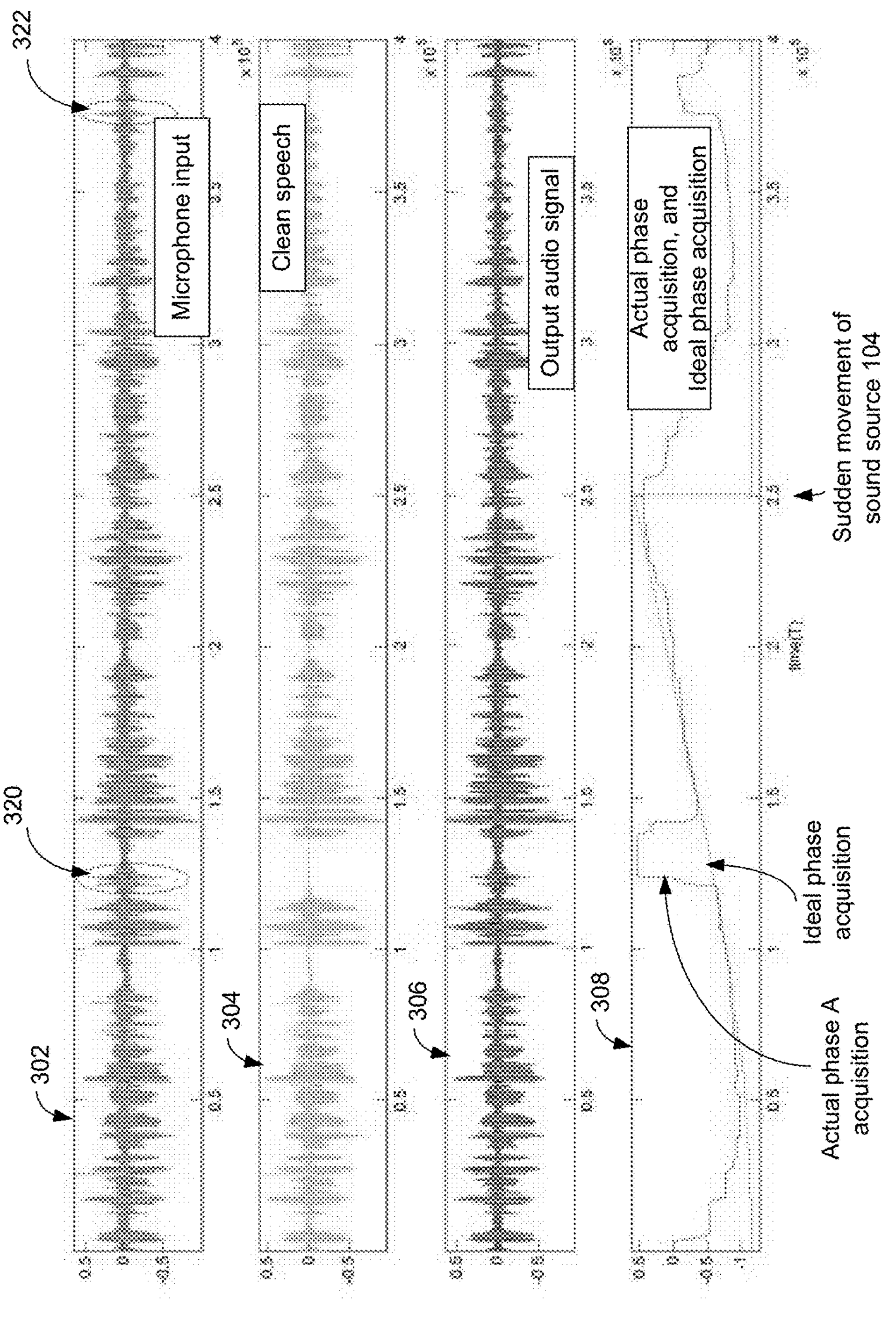
FIG. 3 illustrates graphs depicting an operation of the system of FIG. 1, when the system operates in the first mode.

FIG. 3 illustrates graphs 302, 304, 306 and 308 depicting an operation of the system 100 when the phase loops 120_a_ and 120_b_ operate solely in the SSL mode and when the gain circuits 128_a_ and 128_b_ have relatively low gains (e.g., compared to the gains in FIG. 2). FIG. 3 is at least in part similar to FIG. 2. For example, the operating conditions assumed in FIG. 2 (e.g., other than the gain of the gain circuits 128_a_ and 128_b_) applies to FIG. 3. Also, various graphs 302, . . . , 308 of FIG. 3 respectively correspond to the graphs 202, . . . , 208 of FIG. 2.

In FIG. 3, the gain of the gain circuits 128_a_ and 128_b_ is relatively low (e.g., compared to the gains in FIG. 2). Accordingly, the phase loops 120_a_ and 120_b_ react slowly, which results in an undesirable effect of slow phase acquisition during initialization, as illustrated in the graph 304.

Tracking Mode

In the tracking mode, the phase loops 120_a_ and 120_b_ track slow movement of the sound source 104 and also avoid disturbance from large noise peaks. In an example, while operating in the tracking mode, an output of each of the phase error detectors 122_a_ and 122_b_ is somewhat proportional to a delay between the corresponding intermediate signal and the average signal d, provided the delay in within the range [−T, T] and the voice activity detection circuit 118 indicates the presence of sound from the sound source 104, where T is the time interval used in the system 100. That is, for the tracking mode, if the voice activity detection circuit 118 indicates the presence of sound from the sound source 104, an output of the phase error detector 122_a_ is substantially proportional to the delay between the signal Xa and the average signal d, provided the delay in within the range [−T, T]. The output of the phase error detector 122_a_ reaches saturation once the delay is outside this range. The phase error detector 122_b_ also operates in a similar manner. Also, if the voice activity detection circuit 118 indicates the absence of sound from the sound source 104, the output of the phase error detectors 122_a_ and 122_b_ are zero.

Figure 4:
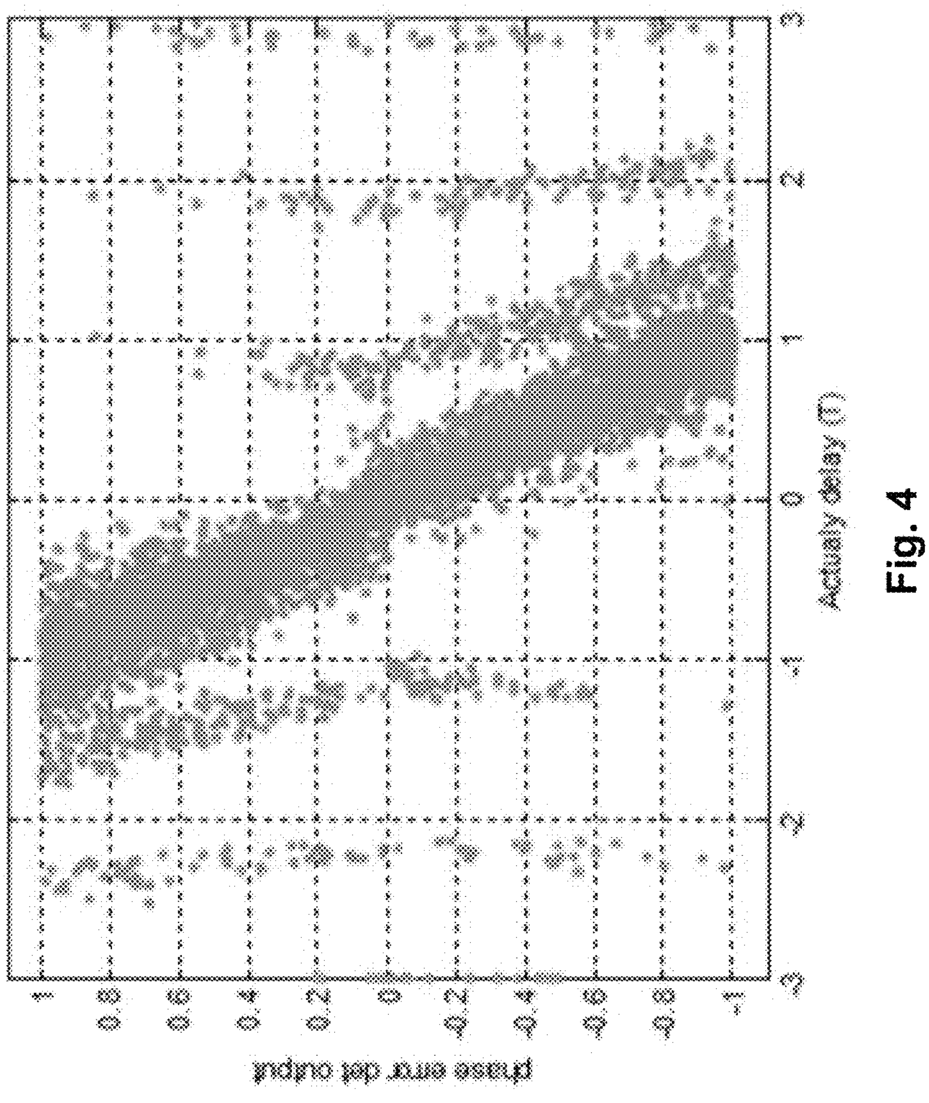
FIG. 4 illustrates a simulated output of a phase error detector, while the phase error detector operates in a second mode.

FIG. 4 illustrates a simulated output of one of the phase error detectors 122_a_ and 122_b_ while the phase error detectors 122_a_ and 122_b_ operate in the tracking mode. The X-axis in FIG. 4 represents the delay in terms of T, and the Y-axis represents an output of the phase error detector. As seen in FIG. 4, the output of the phase error detector is substantially proportional to the delay between the corresponding intermediate signal and the average signal d, provided the delay in within the range [−T, T].

Figure 5:
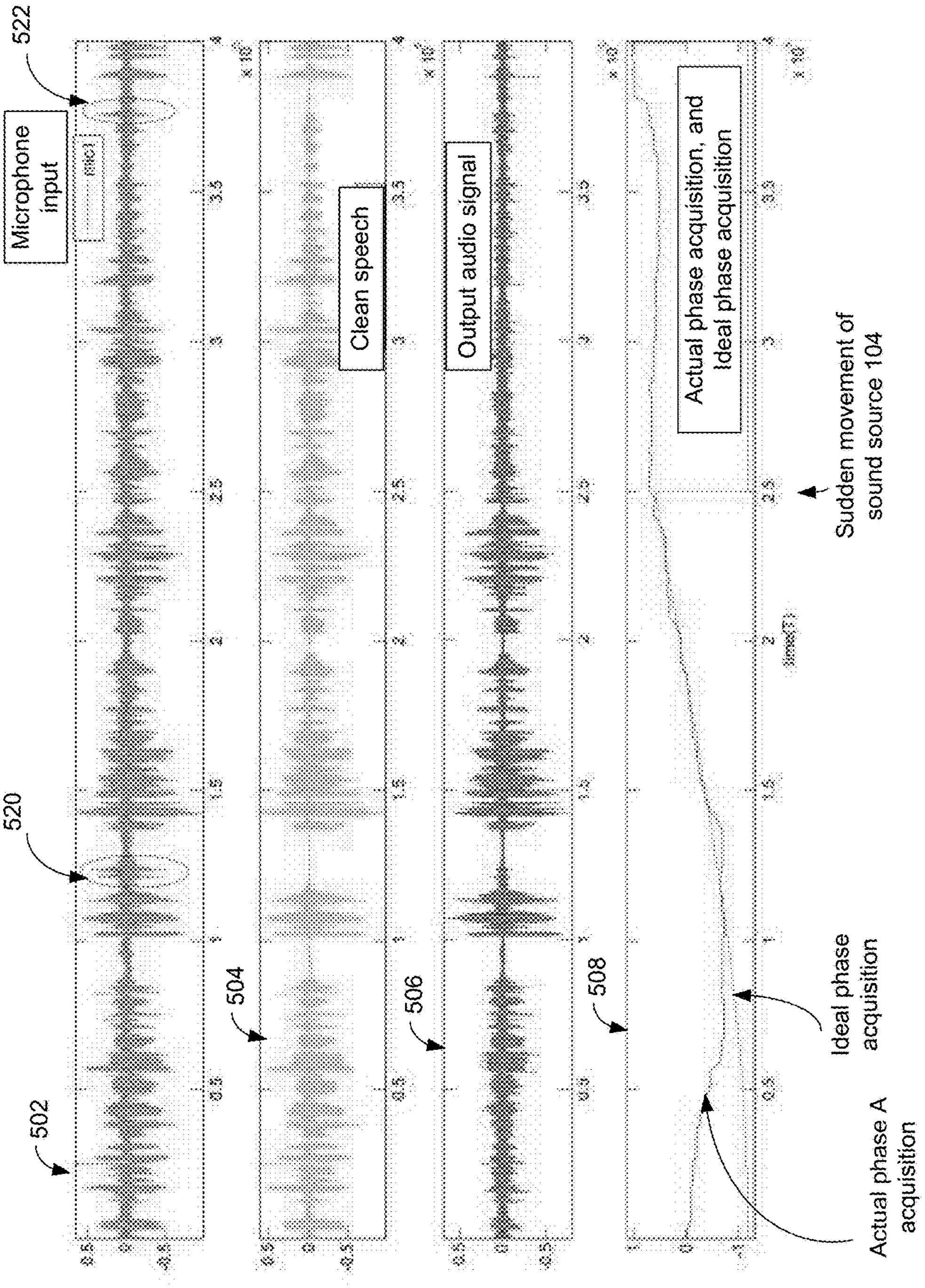
FIG. 5 illustrates graphs depicting an operation of the system of FIG. 1, when the system operates in a second mode.

FIG. 5 illustrates graphs 502, 504, 606 and 508 depicting an operation of the system 100 when the phase loops 120_a_ and 120_b_ operate solely in the tracking mode, and when the gain circuits 128_a_ and 128_b_ have relatively low gains (e.g., compared to the gains in the SSL mode). An X axis in each of the graphs 502, . . . , 508 represents time in time interval T. Similar to FIG. 2, in the simulation that generated the graphs 502, . . . , 508, the distance between the microphones 102_a_ and 102_b_ is 5 cm and a sampling frequency of the system is 16 kHz. The sound source 104 is initially at 90 degrees (i.e., initially, θs=90 degrees), and gradually moves from 90 degrees to −30 degrees from time 0T to time $2.5\times10^5$T (i.e., immediate prior to $2.5\times10^5$T, θs=−30 degrees). At time $2.5\times10^5$T, the sound source 104 suddenly jumps to 90 degrees, e.g., due to a change in the person speaking (i.e., immediate after $2.5\times10^5$T, θs=90 degrees). The noise source 106 is always at −90 degrees. Also, the noise from the noise source 106 is on average smaller than the sound from the sound source 104. However, the noise has a few high peaks, e.g., at $1.2\times10^5$T and at $3.75\times10^5$T. The high peaks in the noise are illustrated using oval shapes 520 and 522 in the graph 502.

The top graph 502 illustrates the input to the microphones 102_a_ and 102_b_ versus time. In the graph 502, the points 520 and 522 represent high peaks in the noise. The graph 504 illustrates hypothetical clean speech, i.e., sound from the sound source 104 without any noise from the noise source 106. The graph 506 illustrates the output audio signal 164. The graph 506 illustrates an actual phase acquisition of the phase loops 120_a_ and 120_b_, and also illustrates an ideal phase acquisition of the phase loops 120_a_ and 120_b_.

While the system 100 operates in the tracking mode, the actual phase acquisition cannot track the ideal phase acquisition with reasonable accuracy during initialization, and also during sudden movement of the sound source 104. However, the system 100 can track slow and gradual movement of the sound source 104 with reasonable accuracy once the phase is acquired. Also, the actual phase acquisition tracks the ideal phase acquisition with reasonable accuracy in event of momentarily loud peaks (e.g., at 520 and 522). Thus, the loud peaks do not significantly show up in the output audio signal 164.

In the system 100, once the phase is reasonably acquired, the sound component in each of the signals Xa and Xb are aligned to the sound component in the average signal d. However, the noise component in each of the signals Xa and Xb are largely mis-aligned to the noise component in the average signal d. Therefore, in the tracking mode, a delay within the range [−T, T] represents a delay between the sound components of the corresponding intermediate signal (e.g., signal Xa or Xb) and the average signal d, while a delay outside the range [−T, T] represents a delay between the noise components of the corresponding intermediate signal (e.g., signal Xa or Xb) and the average signal d. Also, as noted above, output of each of the phase error detectors 122_a_ and 122_b_ reaches saturation once the delay is outside the range [−T, T]. Thus, in an event of a large noise peak (e.g. as in points 520 and 522), the delay in the noise components of the corresponding intermediate signal (e.g., signal Xa or Xb) and the average signal d will be outside this range, and hence, be ignored by the phase loops 120_a_, 120_b_. Accordingly, the phase loops 120_a_ and 120_b_, while operating in the tracking mode, can effectively avoid or filter out large peaks in the noise (e.g. as in points 520 and 522).

Combined Operation in the SSL Mode and Tracking Mode

As discussed herein above, in the SSL mode, the phase loops 120$a$ and 120$b$ can effectively acquire the phase during initialization of the system 100, and also during sudden movement of the sound source 104 (e.g., during large value of θs). On the other hand, in the tracking mode, once the phase loops 120$a$ and 120$b$ are acquired, the phase loops 102$a$ and 120$b$ can effectively track gradual movement the sound source 104 and can also effectively suppress or filer out loud noise peaks.

Accordingly, in an example, the system 100 is periodically switched between the SSL mode and the tracking mode. For example, the SSL mode is periodically run for k=0, N, 2N, 3N, . . . , where k is the time index, and N is a large positive integer. For each occurrence, the SSL mode is run, for example, for 1024 time periods (i.e., for long enough for the phase loops 120$a$ and 120$b$ to re-acquire the corresponding phase). For the reminder of the time, the system 100 operates in the tracking mode. Merely as an example, the system 100 periodically operates in the SSL mode at an interval of every 2 seconds (and also during the initialization of the system 100). Also, for each occurrence, the system 100 operates in the SSL mode for 0.1 seconds. For the reminder of the time, the system 100 operates in the tracking mode.

Figure 6:
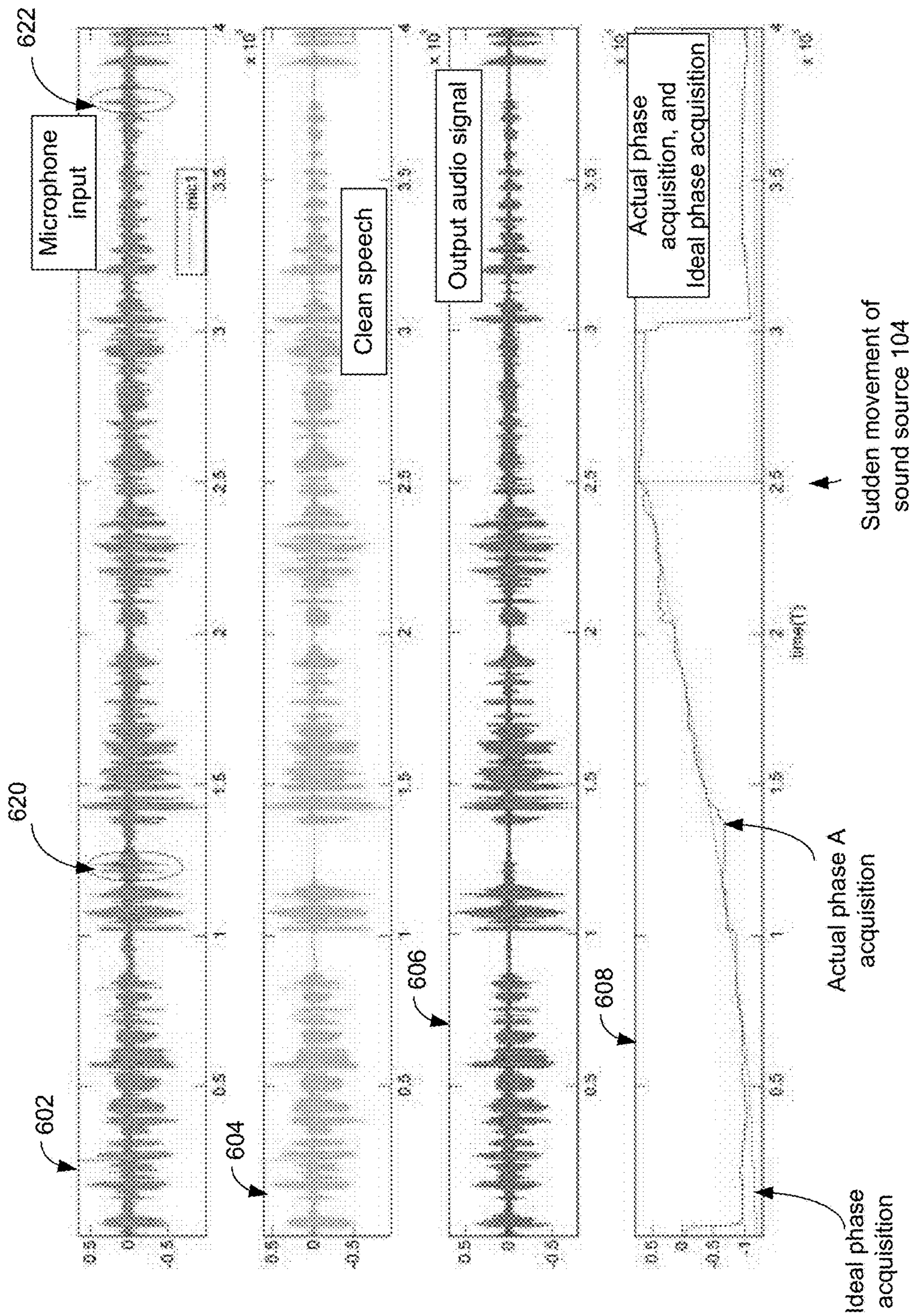
FIG. 6 illustrates graphs depicting an operation of the system of FIG. 1, when the system operates alternatingly in the first mode and the second mode.

FIG. 6 illustrates graphs 602, 604, 606 and 608 illustrating an operation of the system 100 when the phase loops 120$a$ and 120$b$ operate alternatingly in the SSL mode and the tracking mode. Similar to FIGS. 2, 4 and 5, in FIG. 6, an X axis in each of the graphs 602, . . . , 608 represents time in time interval T. Also, in the simulation that generated the graphs 602, . . . , 608, the distance between the microphones 102$a$ and 102$b$ is 5 cm, and a sampling frequency of the system is 16 kHz. The sound source 104 is initially at 90 degrees (i.e., initially, θs=90 degrees), and gradually moves from 90 degrees to −30 degrees from time OT to time $2.5\times10^5$T (i.e., immediate prior to $2.5\times10^5$T, θs=−30 degrees). At time $2.5\times10^5$T, the sound source 104 suddenly jumps to 90 degree, e.g., due to a change in the person speaking (i.e., immediately after $2.5\times10^5$T, θs=90 degrees). The noise source 106 is always at −90 degrees. Also, the noise from the noise source 106 is on average smaller than the sound from the sound source 104. However, the noise has a few high peaks, e.g., at $1.2\times10^5$T and at $3.75\times10^5$T. The high peaks in the noise are illustrated using oval shapes 620 and 622 in the graph 602.

The top graph 602 illustrates the input to the microphones 102$a$ and 102$b$ versus time. In the graph 602, the points 620 and 622 represent high peaks in the noise. The graph 604 illustrates hypothetical clean speech, i.e., sound from the sound source 104 without any noise from the noise source 106. The graph 606 illustrates the output audio signal 164. The graph 606 illustrates an actual phase acquisition of the phase loops 120$a$ and 120$b$, and also illustrates an ideal phase acquisition of the phase loops 120$a$ and 120$b$.

In FIG. 6, the system 100 operates in the SSL mode during initialization of the system 100 (e.g., at T=0) for about, for example, 1024 time periods (i.e., the system 100 operates in the SSL mode from time T=0 to 1024). Also, the system 100 operates in the SSL mode from $3\times10^5$T to $(3\times10^5+1024)$T. At other times, the system 100 operates in the tracking mode.

During initialization of the system 100, the system 100 operates in the SSL mode, and the phase loops 120$a$ and 120$b$ relatively quickly acquires the corresponding phases (e.g., as illustrated in the graph 608, the actual phase converges at or near the ideal phase rapidly during initialization). Subsequently, the system 100 starts operating in the tracking mode. The tracking mode is effective in suppressing the high noise peak at 620, which is filtered out and is not reflected in the output audio signal 164.

At $2.5\times10^5$T, while the system 100 is still operating in the tracking mode, there is a sudden movement of the sound source 104. For reasons discussed herein above, the phase loops 120$a$ and 120$b$ are not able to acquire the phases effectively, thereby resulting in a large gap between the actual phase acquisition and the ideal phase acquisition.

However, at $3\times10^5$T, the system 100 once again starts operating in the SSL mode, which results in a rapid re-acquisition of the phase by the phase loops 120$a$ and 120$b$. Subsequent to the re-acquisition of the phase, the system 100 once again starts operating in the tracking mode. The tracking mode is effective in suppressing the high noise peak at 622, which is filtered out and is not reflected in the output audio signal 164.

In an example, the alternate operation of the SSL mode and the tracking mode ensures rapid re-acquisition of the phase by the phase loops 120$a$ and 120$b$ in case of sudden sound source movement, while suppressing high noise peaks, as illustrated in FIG. 6.

In an example, the system 100 can be configured based on various factors. For example, if a direction of the sound source 104 is known and fixed (i.e., if θs is known and fixed), then the phase loops 102$a$ and 102$b$ can be frozen (i.e., not dynamically updated) and the accumulators 126$a$ and 126$b$ can output respective pre-determined fixed values.

In another example, in the case where the initial portion of the sound source 104 is known and the sound source 104 can only move gradually or slightly at a known angle, the accumulators 126$a$ and 126$b$ can be initialized at the respective pre-determined fixed values, and the system 100 can operate the tracking mode only (e.g., because the sound source 104 is known to not make any sudden movement, the SSL mode can be switched off).

In yet another example, in the case where (i) the initial position of the sound source 104 is unknown, (ii) the sound source 104 does not move at all, and (iii) there is no large noise peak at the beginning, the system 100 can operate at the SSL mode during initialization and then the phase loops 102$a$ and 102$b$ can be frozen or locked at the end of the SSL mode.

In another example, in the case where the sound source 104 moves gradually at an unknown angle and there is no large noise peaks in beginning, the system 100 can operate in the SLL mode during initialization and then the system 100 can operate solely in the tracking mode.

In yet another example, if, for example, the microphone (e.g., which can be embedded in a headphone, a cell phone, or the like) has a motion detector, then the SSL mode can be initiated each time a sudden movement of the sound source is detected. Otherwise, the system 100 may operate in the tracking mode.

Method of Operation

Figure 7:
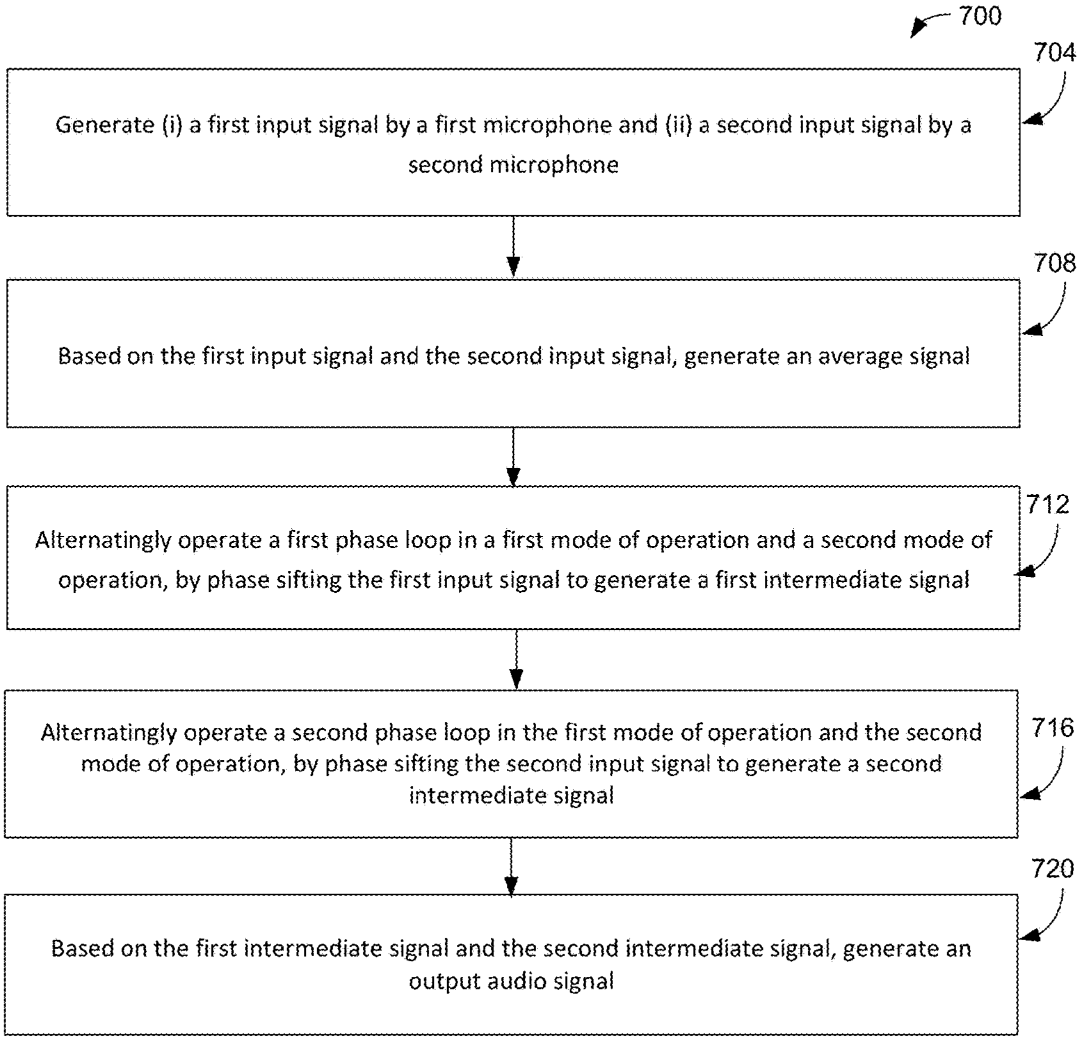
FIG. 7 illustrates a flow diagram of an example method for operating an audio reception system.

FIG. 7 illustrates a flow diagram of an example method 700 for operating an audio reception system (e.g., system 100 of FIG. 1). At 704, based on receiving audio signals from a sound source (e.g., sound source 104) and a noise source (e.g., noise source 106), a first microphone (e.g., microphone 102$a$) generates a first input signal (e.g., signal Ma) and a second microphone (e.g., microphone 102$b$) generates a second input signal (e.g., signal Mb). At 708, based on the first input signal and the second input signal, an average signal (e.g., average signal d) is generated (e.g., by the multiplier circuits 108*a* and 108*b*, and the addition circuit 110).

At 712, a first phase loop (e.g., phase loop 120*a*) alternatingly operates in a first mode of operation and a second mode of operation, by phase shifting the first input signal to generate a first intermediate signal. In an example, a sound component in the first intermediate signal is substantially phase aligned with a sound component in the average signal. At 716, a second phase loop (e.g., phase loop 120*b*) alternatingly operates in the first mode of operation and the second mode of operation, by phase shifting the first input signal to generate a second intermediate signal. In an example, a sound component in the second intermediate signal is substantially phase aligned with a sound component in the average signal.

At 720, based on the first intermediate signal and the second intermediate signal, an output audio signal (e.g., the output audio signal 164) is generated. In an example, the output audio signal comprises audio signals from the sound source.

The description may use the phrases "in an embodiment," or "in embodiments," which may each refer to one or more of the same or different embodiments. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:

receiving, at a first microphone and a second microphone, audio signals from a sound source and a noise source;

generating, based on the receiving audio signals from the sound source and the noise source, (i) a first input signal by the first microphone, wherein the first input signal comprises audio signals from the sound source and audio signals from the noise source and (ii) a second input signal by the second microphone, wherein the second input signal comprises audio signals from the sound source and audio signals from the noise source;

generating, by an averaging circuit and based on the first input signal and the second input signal, an average signal;

operating a first phase loop by phase shifting the first input signal to generate a first intermediate signal such that a sound component in the first intermediate signal is substantially phase aligned with a sound component in the average signal, wherein operating the first phase loop further comprises:

operating the first phase loop in a first mode of operation during a first time period, and operating the first phase loop in a second mode of operation during a second time period, wherein the second mode of operation is different from the first mode of operation;

operating a second phase loop by phase shifting the second input signal to generate a second intermediate signal such that a sound component in the second intermediate signal is substantially phase aligned with the sound component in the average signal; and generating, by an output circuit and based on the first intermediate signal and the second intermediate signal, an output audio signal that comprises audio signals from the sound source and no audio signals from the noise source.

2. The method of claim 1, wherein operating the first phase loop further comprises:

alternatingly operating the first phase loop in the first mode of operation and the second mode of operation.

3. The method of claim 1, wherein operating the first phase loop further comprises:

determining, by a first phase error detector, a phase difference between the average signal and the first intermediate signal, wherein phase shifting the first input signal to generate the first intermediate signal comprises based on the phase difference between the average signal and the first intermediate signal, phase shifting the first input signal to generate the first intermediate signal.

4. The method of claim 3, wherein determining the phase difference between the average signal and the first intermediate signal, while operating the first phase loop in the first mode of operation, comprises:

for a time index k, determining a first difference between the average signal at time (k−1) and the average signal at time (k+1);

determining a second difference between the first intermediate signal at time (k) and the average signal at time (k); and while operating the first phase loop in the first mode of operation, determining the phase difference between the average signal and the first intermediate signal for time (k) based on (i) the first difference and (ii) the second difference.

5. The method of claim 3, wherein determining the phase difference between the average signal and the first intermediate signal, while operating the first phase loop in the second mode of operation, comprises:

while operating the first phase loop in the second mode of operation, determining a delay between a phase of the average signal and a phase of the first intermediate signal; and in response to the delay being within a threshold range, determining the phase difference such that the phase difference is proportional to the delay between the phase of the average signal and the phase of the first intermediate signal.

6. The method of claim 3, wherein determining the phase difference between the average signal and the first intermediate signal, while operating the first phase loop in the second mode of operation, comprises:

while operating the first phase loop in the second mode of operation, determining a delay between a phase of the average signal and a phase of the first intermediate signal; and in response to the delay being outside a threshold range, determining the phase difference such that the phase difference is not proportional to the delay between the phase of the average signal and the phase of the first intermediate signal.

7. The method of claim 1, wherein the average signal is a first average signal, and wherein generating the output audio signal comprises:

averaging the first intermediate signal and the second intermediate signal to generate a second average signal;

based on a difference between the first intermediate signal and the second intermediate signal, generating a third intermediate signal; and based on the second average signal and the third intermediate signal, generating the output audio signal.

8. The method of claim 7, wherein generating the output audio signal further comprises:

processing the third intermediate signal to generate a fourth intermediate signal; and based on a difference between the second average signal and the fourth intermediate signal, generating the output audio signal.

9. The method of claim 8, wherein:

the second average signal comprises (i) sound component from the sound source and (ii) noise component from the noise source;

the fourth intermediate signal comprises noise component from the noise source; and the fourth intermediate signal does not comprise sound component from the sound source.

10. The method of claim 1, wherein operating the first phase loop further comprises:

operating the first phase loop in the first mode of operation (i) during an initialization of the first phase loop and (i) during a detection of a movement of the sound source relative to at least one of the first microphone or the second microphone.

11. A system comprising:

a first microphone configured to (i) receive audio signals from a sound source and a noise source and (ii) generate a first input signal comprising audio signals from the sound source and audio signals from the noise source;

a second microphone configured to (i) receive the audio signals from the sound source and the noise source and (ii) generate a second input signal, comprising audio signals from the sound source and audio signals from the noise source;

an averaging circuit configured to generate, based on the first input signal and the second input signal, an average signal;

a first phase loop configured to phase shift the first input signal to generate a first intermediate signal such that a sound component in the first intermediate signal is substantially phase aligned with a sound component in the average signal, wherein the first phase loop is further configured to during a first time period, operate in a first mode of operation, and during a second time period, operate in a second mode of operation, wherein the second mode of operation is different from the first mode of operation;

a second phase loop configured to phase shift the second input signal to generate a second intermediate signal such that a sound component in the second intermediate signal is substantially phase aligned with the sound component in the average signal; and an output circuit configured to generate, based on the first intermediate signal and the second intermediate signal, an output audio signal that comprises audio signals from the sound source and no audio signals from the noise source.

12. The system of claim 11, wherein the first phase loop is further configured to:

alternatingly operate in the first mode of operation and the second mode of operation.

13. The system of claim 11, wherein the first phase loop is further configured to operate by:

determining a phase difference between the average signal and the first intermediate signal; and based on the phase difference between the average signal and the first intermediate signal, phase shifting the first input signal to generate the first intermediate signal.

14. The system of claim 13, wherein the first phase loop is further configured to determine the phase difference between the average signal and the first intermediate signal, while operating the first phase loop in the first mode of operation, by:

for a time index k, determining a first difference between the average signal at time (k−1) and the average signal at time (k+1);

determining a second difference between the first intermediate signal at time (k) and the average signal at time (k); and while operating the first phase loop in the first mode of operation, determining the phase difference between the average signal and the first intermediate signal for time (k) based on (i) the first difference and (ii) the second difference.

15. The system of claim 13, wherein the first phase loop is further configured to determine the phase difference between the average signal and the first intermediate signal, while operating the first phase loop in the second mode of operation, by:

while operating the first phase loop in the second mode of operation, determining a delay between a phase of the average signal and a phase of the first intermediate signal; and in response to the delay being within a threshold range, determining the phase difference such that the phase difference is proportional to the delay between the phase of the average signal and the phase of the first intermediate signal.

16. The system of claim 13, wherein the first phase loop is further configured to determine the phase difference between the average signal and the first intermediate signal, while operating the first phase loop in the second mode of operation, by:

while operating the first phase loop in the second mode of operation, determining a delay between a phase of the average signal and a phase of the first intermediate signal; and in response to the delay being outside a threshold range, determining the phase difference such that the phase difference is not proportional to the delay between the phase of the average signal and the phase of the first intermediate signal.

17. The system of claim 11, wherein the output circuit is configured to generate the output audio signal by:

averaging the first intermediate signal and the second intermediate signal to generate a second average signal;

based on a difference between the first intermediate signal and the second intermediate signal, generating a third intermediate signal; and based on the second average signal and the third intermediate signal, generating the output audio signal.

18. The system of claim 17, wherein the output circuit is further configured to generate the output audio signal by:

processing the third intermediate signal to generate a fourth intermediate signal; and based on a difference between the second average signal and the fourth intermediate signal, generating the output audio signal.

19. The system of claim 18, wherein:

the second average signal comprises (i) sound component from the sound source and (ii) noise component from the noise source;

the fourth intermediate signal comprises noise component from the noise source; and the fourth intermediate signal does not comprise sound component from the sound source.

20. The system of claim 11, wherein the first phase loop is further configured to operate in the first mode of operation (i) during an initialization of the first phase loop and (i) during a detection of a movement of the sound source relative to at least one of the first microphone or the second microphone.

* * * * *